United States Patent
Choi

(10) Patent No.: US 8,032,770 B2
(45) Date of Patent: Oct. 4, 2011

(54) VIDEO PROCESSING APPARATUS AND CONTROL METHOD THAT COMPARES COUNTED POWER SUPPLY TIME WITH A REFERENCE TIME

(75) Inventor: Byeong-bae Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 671 days.

(21) Appl. No.: 12/117,077

(22) Filed: May 8, 2008

(65) Prior Publication Data
US 2009/0094471 A1    Apr. 9, 2009

(30) Foreign Application Priority Data
Oct. 9, 2007    (KR) .................. 10-2007-0101585

(51) Int. Cl.
*G06F 1/32* (2006.01)
(52) U.S. Cl. ...................... 713/320; 345/211
(58) Field of Classification Search ............ 345/211; 713/320
See application file for complete search history.

(56) References Cited

U.S. PATENT DOCUMENTS

| 6,404,423 B1* | 6/2002 | Kivela et al. ............. 345/212 |
| 7,222,250 B2* | 5/2007 | Matsubara ................ 713/320 |
| 2006/0007225 A1* | 1/2006 | Kim ......................... 345/211 |

FOREIGN PATENT DOCUMENTS

JP       5-188894 A       7/1993
KR    10-2000-0045142 A   7/2000

* cited by examiner

*Primary Examiner* — Albert Wang
(74) *Attorney, Agent, or Firm* — Sughrue Mion, PLLC

(57) ABSTRACT

A video processing apparatus and a control method thereof are provided. The video processing apparatus includes: a processing unit which processes a video signal for display; a clock generating unit which generates a system clock for driving the processing unit and outputs the system clock to the processing unit; a power supply unit which supplies power to the processing unit; and a controller which counts a power supply time using a clock generated from the system clock. The controller compares the counted power supply time with a predetermined reference time, and controls power supplied to the processing unit from the power supply unit.

22 Claims, 5 Drawing Sheets

VIDEO PROCESSING APPARATUS AND CONTROL METHOD THAT COMPARES COUNTED POWER SUPPLY TIME WITH A REFERENCE TIME

CROSS-REFERENCE TO RELATED APPLICATION

This application claims priority from Korean Patent Application No. 10-2007-0101585, filed on Oct. 9, 2007 in the Korean Intellectual Property Office, the disclosure of which is incorporated herein by reference.

BACKGROUND OF INVENTION

1. Field of Invention

Apparatuses and methods consistent with the present invention relate to a video processing apparatus which can decrease power consumption, and a control method thereof.

2. Description of Related Art

In general, an electronic device, such as a television, a computer, or a monitor requires electric power, and extensive efforts have been made to decrease power consumption thereof.

However, in the case of a video processing apparatus, a user often forgets to turn off the video processing apparatus, thereby causing unnecessary power consumption.

For example, in the case that a monitor is connected to a computer body, if the computer is turned off, the monitor does not display an image. In this case, a user is likely to think that the monitor is also turned off, and thus, often maintains the monitor on, thereby causing unnecessary power consumption.

To solve the above problem, a related art video processing apparatus performs a power save mode in which power supplied to some or most elements of the video processing apparatus is cut off if there is no input from a user for a predetermined period of time, so as to decrease power consumption.

However, in order to perform the power save mode, a user must know about the power save mode and set it up in advance. This causes an inconvenience to the user. If the user does not know or set up the power save mode, unnecessary power consumption can not be avoided.

SUMMARY OF INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a video processing apparatus and a control method thereof which can cut off power if a power supply time exceeds a predetermined reference time, so as to decrease power consumption.

The present invention also provides a video processing apparatus and a control method thereof which can count a power supply time using an internal clock generating unit to decrease power consumption without a separate timer.

According to an aspect of the present invention, there is provided a video processing apparatus comprising: a processing unit which processes a video signal for display; a clock generating unit which generates a system clock for driving the processing unit and outputs the system clock to the processing unit; a power supply unit which supplies power to the processing unit; and a controller which counts a power supply time using a clock derived from the system clock, compares the counted power supply time with a predetermined reference time, and controls the power supplied to the processing unit from the power supply unit based on a result of the comparison.

The video processing apparatus may further include a power cut-off unit which cuts off the power, and the controller may control the power cut-off unit to cut off the power supplied to the processing unit if the counted power supply time exceeds the reference time.

The controller may count the power supply time using the derived clock if the power is supplied to the processing unit.

The video processing apparatus may further include an external signal input unit which inputs the video signal from an external source, and the controller may count the power supply time using the clock if the video signal is abnormally input through the external signal input unit.

The controller may count the power supply time if at least one of a horizontal synchronous signal and a vertical synchronous signal is not included in the video signal input through the external signal input unit.

The processing unit may include an On-Screen Display (OSD) generating unit which generates an OSD signal, and the controller may control the processing unit to display the OSD signal.

The OSD generating unit may generate a time set-up menu for setting up the reference time, and the controller may control the processing unit to display the time set-up menu together with the video signal.

The OSD generating unit may generate a selection menu for selecting power cut-off, and the controller may control the processing unit to display the selection menu and cut off the power supplied to the processing unit if the power cut-off is selected through the selection menu.

The OSD generating unit may generate the selection menu for selecting the power cut-off if the counted power supply time exceeds the reference time.

According to another aspect of the present invention, there is provided a control method of a video processing apparatus which includes a processing unit for processing a video signal for display, the comprising: generating a system clock for driving the processing unit; counting a power supply time through a clock derived from the system clock; comparing the counted power supply time with a predetermined reference time; and controlling power supplied to the processing unit based on a result of the comparing.

The method may further include controlling the power supplied to the processing unit if the counted power supply time exceeds the reference time.

The method may further include supplying the power to the processing unit, and the counting the power supply time may include counting the power supply time using the derived clock if the power is supplied to the processing unit.

The method may further include receiving the video signal, and the counting the power supply time may include counting the power supply time using the clock if the video signal is abnormally input.

The counting the power supply time may include counting the power supply time if at least one of a horizontal synchronous signal and a vertical synchronous signal is not included in the video signal.

The method may further include generating an OSD signal and displaying the OSD signal.

The displaying the OSD signal may include generating a time set-up menu for setting up the reference time and displaying the time set-up menu together with the video signal.

The displaying the OSD signal may include generating a selection menu for selecting power cut-off and displaying the selection menu; and cutting off the power supplied to the processing unit if the power cut-off is selected through the selection menu.

The selection menu may be generated and displayed if the counted power supply time exceeds the reference time.

BRIEF DESCRIPTION OF DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Figure 1:
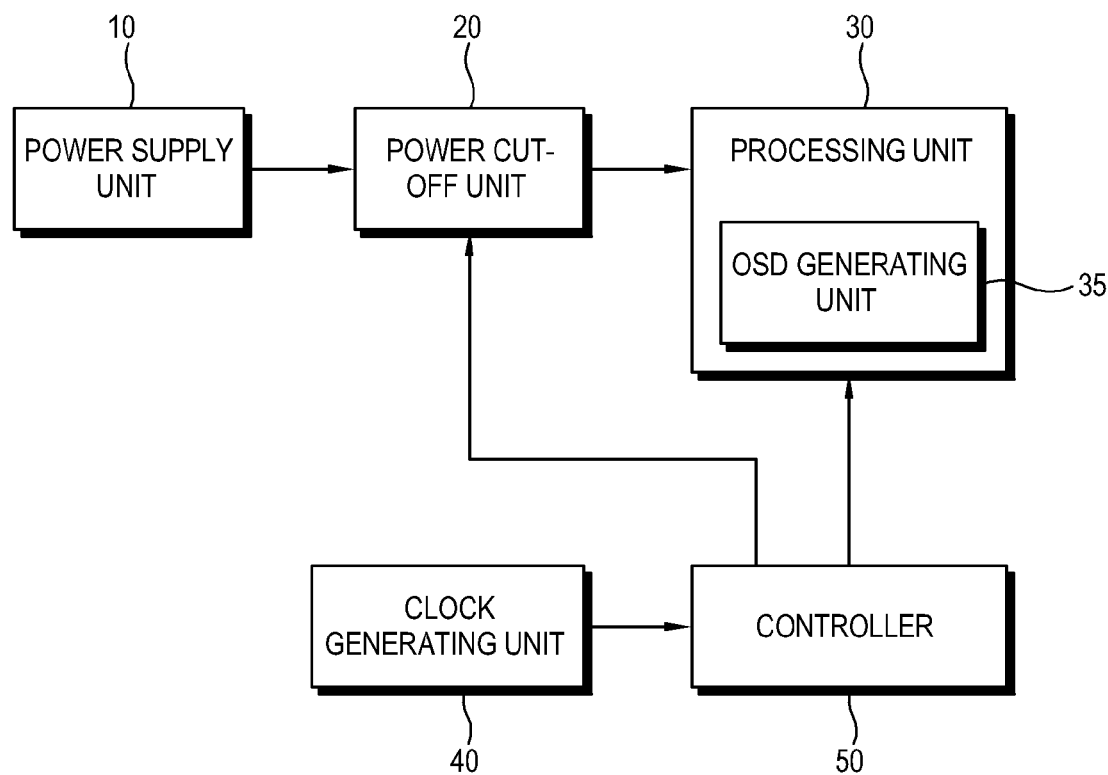
FIG. 1 and FIG. 2 are block diagrams illustrating video processing apparatuses according to exemplary embodiments of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures. As for the same elements of various embodiments, repetitive descriptions will be avoided as necessary.

Referring to FIG. 1, a video processing apparatus according to an exemplary embodiment of the present invention includes a power supply unit 10, a power cut-off unit 20, a processing unit 30, a clock generating unit 40, and a controller 50.

The power supply unit 10 receives alternating current (AC) power from the outside, converts it into a voltage level necessary for each module of the processing unit 30, and outputs it. The power supply unit 10 may be provided as an alternating current/direct current (AC/DC) converter.

The power cut-off unit 20 supplies or cuts off power supplied from the power supply unit 10 under the control of the controller 50. The power cut-off unit 20 may be provided as a switch.

The processing unit 30 processes an input video signal under the control of the controller 50, converts it into an image displayable format, for example, into digital RGB signals for output.

The processing unit 30 may have various functions corresponding to the format of the input video signal, for example, an analog to digital (A/D) converting function for converting input video signals having various formats into a digital video signal having a certain format, a digital decoding function, a scaling function for receiving a digital signal and/or an analog signal and adjusting a vertical frequency, resolution, picture ratio, etc. to be suitable for an output standard, and a predetermined format converting function.

The clock generating unit 40 generates a clock signal for driving the processing unit 30. The clock generating unit 40 may be provided as a crystal oscillator, etc. which is provided inside or outside of the video processing apparatus. The generated clock signal is provided to the processing unit 30 as a system clock. A module included in the processing unit 30 frequency-divides the system clock to use it.

The controller 50 counts a power supply time using the clock generated from the system clock, compares the counted power supply time with a predetermined reference time to control power supplied to the processing unit 30. The controller 50 may be provided as a CPU, a microcomputer, etc.

Hereinafter, the controller 50 will be described in more detail, assuming that the controller 50 counts the power supply time from a point when power is supplied to the processing unit 30 from the power supply unit 10.

Specifically, if power is supplied from the power supply unit 10, the controller 50 counts the power supply time using the system clock generated by the clock generating unit 40. The system clock has a certain frequency, for example, 60 Hz. The controller 50 may count the power supply time using the number of high pulses or low pulses of the clock generated from the system clock.

Figure 3:
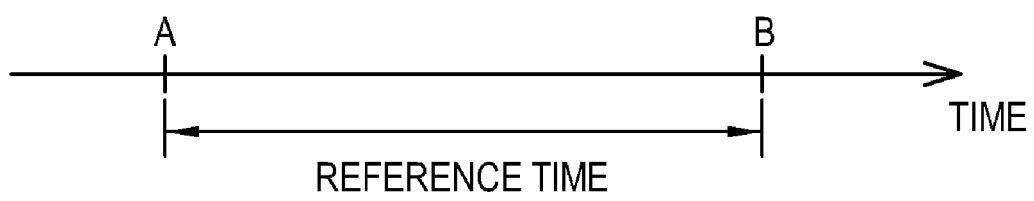
FIG. 3 illustrates a reference time in a video processing apparatus according to an exemplary embodiment of the present invention.

The controller 50 determines whether or not the counted power supply time exceeds the reference time. Referring to FIG. 3, the reference time represents a time section from a point A when power is supplied to a predetermined point B, and may be set up as 6, 8, 10 hours, or the like in the manufacturing process of the video processing apparatus.

If the counted power supply time exceeds the reference time, the controller 50 controls the power cut-off unit 20 to cut off power supplied to the processing unit 30. Accordingly, concerned elements of the video processing apparatus stops operating.

Figure 5:
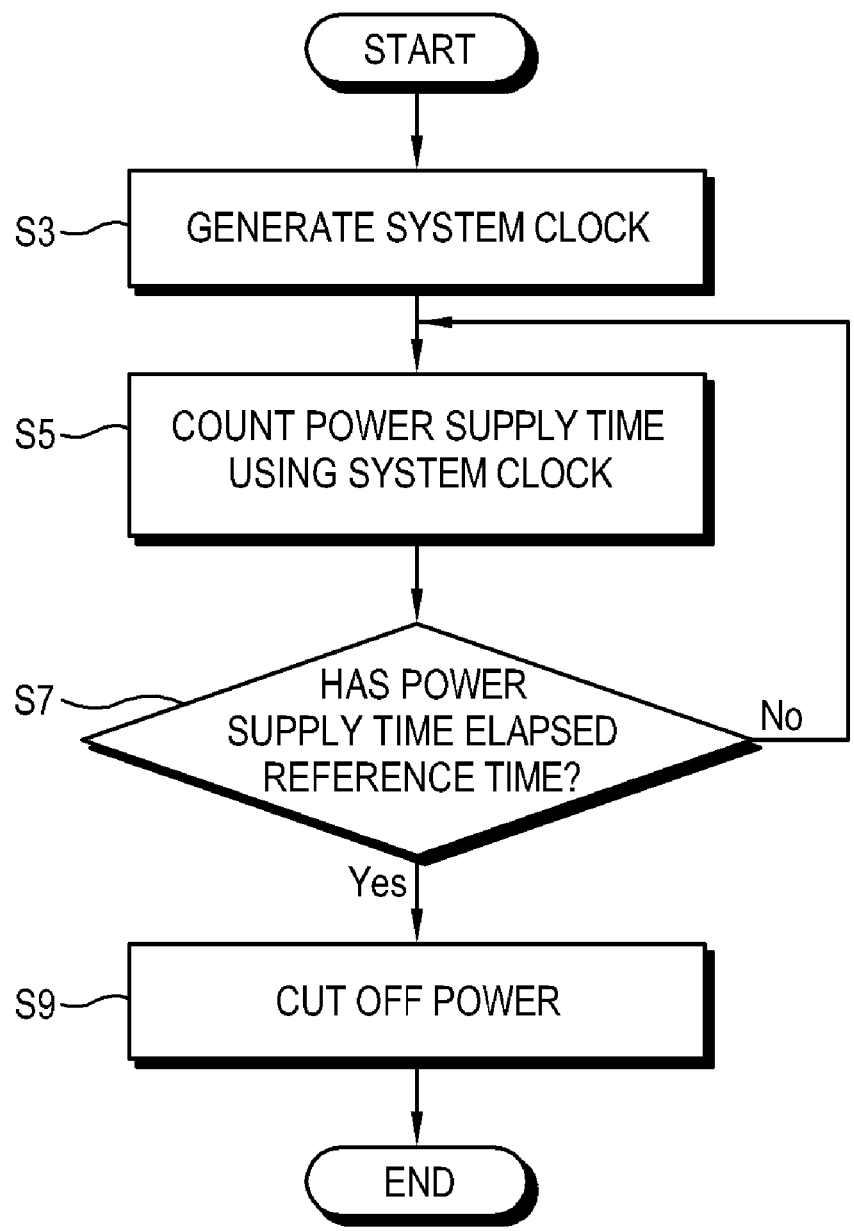
FIG. 5 is a flowchart for illustrating a control method of a video processing apparatus according to an exemplary embodiment of the present invention.

Hereinafter, a control method of a video processing apparatus according to an exemplary embodiment of the present invention will be described with reference to FIG. 5.

Firstly, the clock generating unit 40 generates a system clock (S3). As described above, the system clock is provided to the system unit 30 and is used for processing a video signal.

Then, the controller 50 counts a power supply time using a clock generated from the system clock provided to the processing unit 30 (S5). The controller 50 counts the power supply time from a point when power is supplied to the processing unit 30 from the power supply unit 10.

Then, the controller 50 compares the counted power supply time with the reference time, and then, determines whether or not the counted power supply time has exceeded the reference time (S7).

If it is determined at operation S7 that the counted power supply time has not exceeded the reference time, the controller 50 continuously counts the power supply time using the clock (S5).

If it is determined at operation S7 that the counted power supply time has exceeded the reference time, the controller 50 controls the power cut-off unit 20 to cut off power supplied to the processing unit 30 (S9).

In this way, it is possible to cut off power automatically if the power supply time exceeds the reference time, thereby decreasing power consumption. Further, since the clock generating unit 40 provided in the video processing apparatus is employed to count the power supply time, it is possible to cut off power without a separate timer, thereby decreasing power consumption.

As a second exemplary embodiment, as shown in FIG. 1, the processing unit 30 may further include an OSD generating unit 35 to allow a user to set up the reference time.

The OSD generating unit 35 generates an OSD signal under the control of the controller 50. Here, the OSD generating unit 35 may generate a time set-up menu for setting up the reference time and a selection menu for selecting power cut-off.

If a user wants to select the reference time, the controller 50 controls the OSD generating unit 35 to generate the time set-up menu for setting up the reference time. If the reference time is set up through the time set-up menu, the controller 50 updates the reference time.

If power is supplied to the processing unit 30, the controller 50 counts a power supply time to the processing unit 30 using a clock generated from a system clock. If the counted power supply time exceeds the reference time set up by the user, the controller 50 controls the power cut-off unit 20 to cut off power supplied to the processing unit 30.

Figure 4:
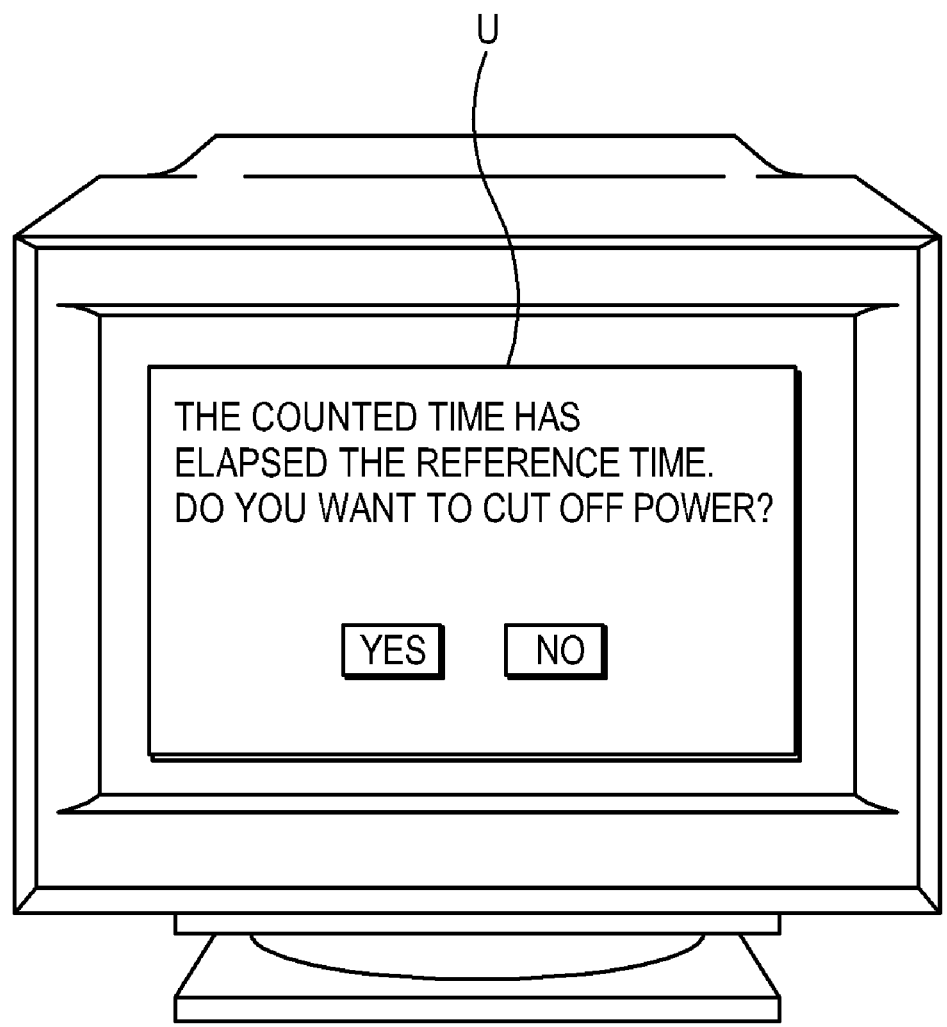
FIG. 4 illustrates a user interface (UT) in a video processing apparatus according to an exemplary embodiment of the present invention.

The controller 50 may control the OSD generating unit 35 to generate the selection menu for selecting power cut-off when power is to be cut off. For example, the selection menu (U) may include a message of "The counted time has exceeded the reference time. Do you want to cut off power?" as shown in FIG. 4.

If power cut-off is selected through the selection menu (U), the controller 50 controls the power cut-off unit 20 to cut off power supplied to the processing unit 30.

If power cut-off is not selected for a predetermined time, the controller 50 may determine that a user is not using the video processing apparatus and control the power cut-off unit 20 to cut off power.

In this way, a user can easily input a condition for power cut-off and select power cut-off, to thereby realize a user interface.

Hereinafter, a video processing apparatus according to a third exemplary embodiment of the present invention will be described with reference to FIG. 2.

Figure 2:
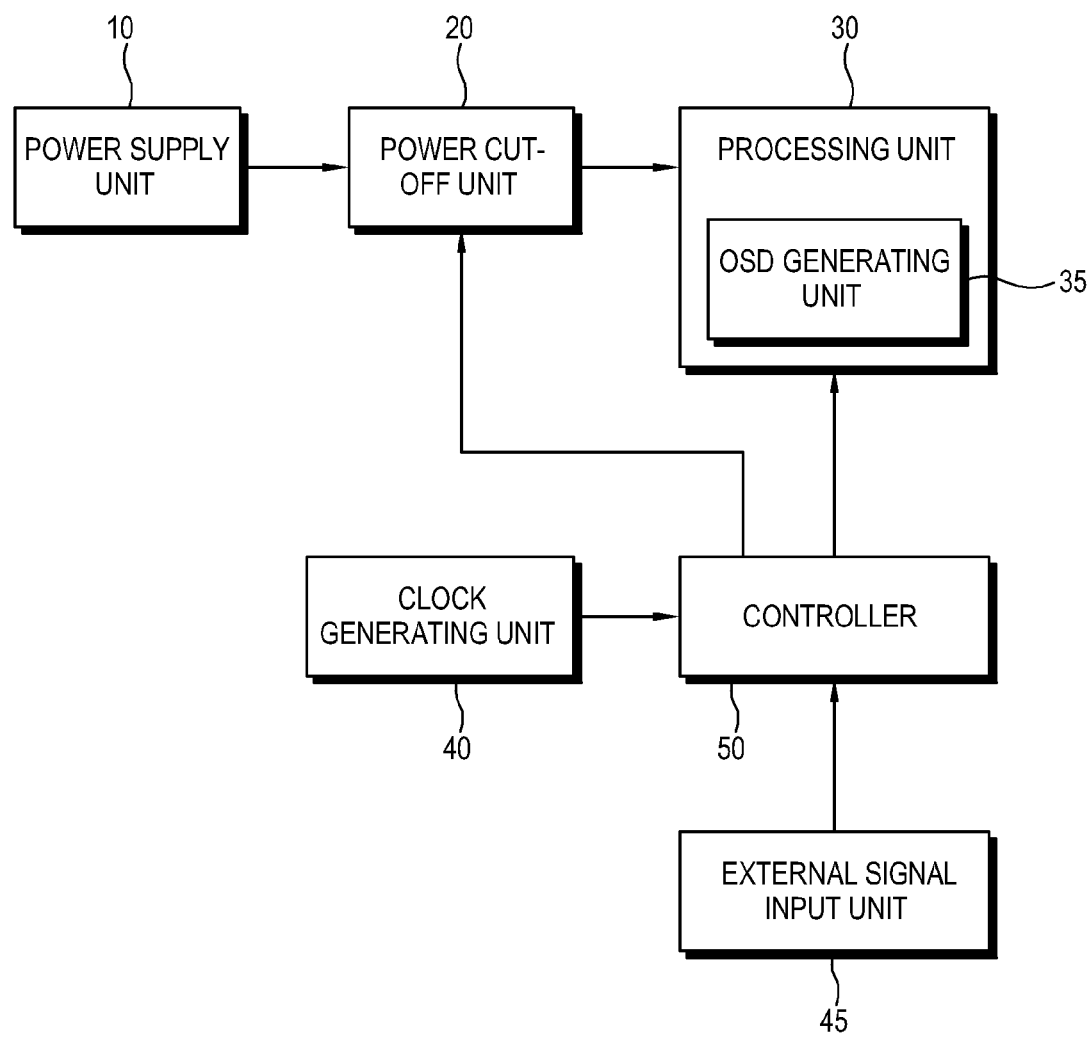

As shown in FIG. 2, the video processing apparatus according to the present embodiment may include a power supply unit 10, a power cut-off unit 20, a processing unit 30, a clock generating unit 40, an external signal input unit 45, and a controller 50. The processing unit may include an OSD generating unit 35.

For the convenience of description, the video processing apparatus according to the present exemplary embodiment may be connected to a computer main body for providing a video signal, by way of example.

The external signal input unit 45 receives a video signal including a synchronous signal from the outside, that is, the computer main body, and may be provided as a variety of input ports.

The controller 50 counts a power supply time using a system clock from a point when a video signal is abnormally input through the external signal input unit 45.

If there is no input from a user for a predetermined time, the computer main body provides a video signal which does not include at least one of a horizontal synchronous signal and a vertical synchronous signal to the video processing apparatus to decrease power consumption. Here, the controller 50 starts to count the power supply time from a point when at least one of the horizontal synchronous signal and the vertical synchronous signal does not input.

Then, the controller 50 compares the counted power supply time with the reference time and determines whether or not the counted power supply time exceeds the reference time.

The reference time may be set up in the manufacturing process of the video processing apparatus, or may be set up by a user through a time set-up menu generated by the OSD generating unit 35.

If the counted power supply time exceeds the reference time, the controller 50 controls the power cut-off unit 20 to cut off power supplied to the processing unit 30.

In this way, the power supply time may be counted using a system clock from the point when a video signal is abnormally input from the computer main body, so as to cut off power if user's input does not continuously exist.

As described above, according to an exemplary embodiment the present invention, it is possible to automatically cut off power if a power supply time exceeds a predetermined reference time, thereby decreasing power consumption.

Further, it is possible to count a power supply time using a clock generating unit provided in a video processing apparatus so as to cut off power without a separate timer, thereby decreasing power consumption.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A video processing apparatus comprising:
    a processing unit which processes a video signal for display;
    a clock generating unit which generates a system clock for driving the processing unit and outputs the system clock to the processing unit;
    a power supply unit which supplies power to the processing unit; and
    a controller which counts a power supply time using a clock derived from the system clock, compares the counted power supply time with a reference time, and controls the power supplied to the processing unit from the power supply unit based on a result of the comparison,
    wherein the controller starts counting the power supply time from a point when the power supply unit begins supplying the power to the processing unit.

2. The video processing apparatus according to claim 1, further comprising a power cut-off unit which cuts off the power, wherein the controller controls the power cut-off unit to cut off the power supplied to the processing unit if the counted power supply time exceeds the reference time.

3. The video processing apparatus according to claim 1, wherein the controller counts the power supply time using the derived clock if the power is supplied to the processing unit.

4. The video processing apparatus according to claim 1, wherein the processing unit comprises an On-Screen Display (OSD) generating unit which generates an OSD signal, and the controller controls the processing unit to display the OSD signal.

5. The video processing apparatus according to claim 4, wherein the OSD generating unit generates a time set-up menu for setting up the reference time, and the controller controls the processing unit to display the time set-up menu together with the video signal.

6. The video processing apparatus according to claim 5, wherein the OSD generating unit generates a selection menu for selecting power cut-off, and the controller controls the processing unit to display the selection menu and cuts off the power supplied to the processing unit if the power cut-off is selected through the selection menu.

7. The video processing apparatus according to claim 6, wherein the OSD generating unit generates the selection menu for selecting the power cut-off if the counted power supply time exceeds the reference time.

8. A control method of a video processing apparatus which comprises a processing unit for processing a video signal for display and a power supply unit which supplies power to the processing unit, the method comprising:
- generating a system clock for driving the processing unit;
- counting a power supply time using a clock derived from the system clock;
- comparing the counted power supply time with a reference time; and
- controlling the power supplied to the processing unit based on a result of the comparing,
- wherein the counting the power supply time starts from a point when the power supply unit begins supplying the power to the processing unit.

9. The method according to claim 8, wherein the controlling the power supplied to the processing unit comprises controlling the power supplied to the processing unit if the counted power supply time exceeds the reference time.

10. The method according to claim 8, further comprising supplying the power to the processing unit, wherein the counting the power supply time comprises counting the power supply time using the derived clock if the power is supplied to the processing unit.

11. The method according to claim 8, further comprising generating an On-Screen Display (OSD) signal and displaying the OSD signal.

12. The method according to claim 11, the displaying the OSD signal comprises generating a time set-up menu for setting up the reference time and displaying the time set-up menu together with the video signal.

13. The method according to claim 11, the displaying the OSD signal comprises:
- generating a selection menu for selecting power cut-off and displaying the selection menu; and
- cutting off the power supplied to the processing unit if the power cut-off is selected through the selection menu.

14. The method according to claim 13, wherein the selection menu is generated and displayed if the counted power supply time exceeds the reference time.

15. A video processing apparatus comprising:
- a computer main body which provides a video signal and monitors user inputs;
- a processing unit which processes the video signal for display;
- a clock generating unit which generates a system clock for driving the processing unit and outputs the system clock to the processing unit;
- a power supply unit which supplies power to the processing unit; and
- a controller which counts a power supply time using a clock derived from the system clock, compares the counted power supply time with a reference time, and controls the power supplied to the processing unit from the power supply unit based on a result of the comparison,
- wherein, if the computer main body detects that no user input has been received for a predetermined amount of time, the computer main body outputs an abnormal video signal to the processing unit instead of a normal video signal.

16. The video processing apparatus according to claim 15, wherein the controller starts counting the power supply time from a point when the computer main body starts supplying the abnormal video signal.

17. The video processing apparatus according to claim 15, wherein the abnormal video signal is a video signal that does not include at least one of a horizontal synchronous signal and a vertical synchronous signal.

18. The video processing apparatus according to claim 15, further comprising a power cut-off unit which cuts off the power, wherein the controller controls the power cut-off unit to cut off the power supplied to the processing unit if the counted power supply time exceeds the reference time.

19. A control method of a video processing apparatus which comprises a processing unit for processing a video signal for display and a power supply unit which supplies power to the processing unit, the method comprising:
- providing the video signal to the processing unit;
- monitoring user inputs;
- generating a system clock for driving the processing unit;
- counting a power supply time using a clock derived from the system clock;
- comparing the counted power supply time with a reference time;
- controlling the power supplied to the processing unit based on a result of the comparing; and
- if there has been no user input detected for a predetermined amount of time, providing an abnormal video signal to the processing unit instead of a normal video signal.

20. The method according to claim 19, wherein the counting the power supply time starts from a point when the abnormal video signal starts being provided to the processing unit.

21. The method according to claim 19, wherein the abnormal video signal is a video signal that does not include at least one of a horizontal synchronous signal and a vertical synchronous signal.

22. The method according to claim 19, wherein the controlling the power supplied to the processing unit comprises cutting off the power supplied to the processing unit if the counted power supply time exceeds the reference time.

* * * * *